United States Patent [19]
Gossner

[11] Patent Number: 6,152,285
[45] Date of Patent: Nov. 28, 2000

[54] CONVEYOR ARRANGEMENT

[75] Inventor: Anton Gossner, Augsburg, Germany

[73] Assignee: WF Logistik GmbH, Landsberg, Germany

[21] Appl. No.: 09/077,633

[22] PCT Filed: Dec. 2, 1996

[86] PCT No.: PCT/DE96/02332

§ 371 Date: Oct. 4, 1999

§ 102(e) Date: Oct. 4, 1999

[87] PCT Pub. No.: WO97/20722

PCT Pub. Date: Jun. 12, 1997

[30] Foreign Application Priority Data

Dec. 5, 1995 [DE] Germany .................. 295 19 285 U

[51] Int. Cl.[7] .................................................. B65G 47/26
[52] U.S. Cl. ............................ 198/459.2; 198/459.1
[58] Field of Search .......................... 198/418.7, 459.1, 198/459.2, 678.1, 464.4

[56] References Cited

U.S. PATENT DOCUMENTS

| | | |
|---|---|---|
| 1,556,724 | 10/1925 | Schaffer . |
| 2,679,810 | 6/1954 | Schutt . |
| 2,991,869 | 7/1961 | Packman et al. ............. 198/459.2 X |
| 3,055,311 | 9/1962 | Sgriccia et al. . |
| 4,261,457 | 4/1981 | Van Maanen .................. 198/459.2 |
| 4,832,178 | 5/1989 | Anderson et al. .............. 198/459.1 |
| 5,450,942 | 9/1995 | Johann et al. . |

FOREIGN PATENT DOCUMENTS

| | | |
|---|---|---|
| 0 143 546 | 6/1985 | European Pat. Off. . |
| 326705 | 8/1989 | European Pat. Off. ......... 198/459.2 |
| 2 175 887 | 12/1986 | United Kingdom . |

Primary Examiner—James R. Bidwell
Attorney, Agent, or Firm—Flynn, Thiel, Boutell & Tanis, P.C.

[57] ABSTRACT

A conveyor arrangement, in particular for conveying suspended items inside a plant, is described, in which a plurality of conveyors are adapted to be conveyed on a track. A separator is provided for separating the conveyors. In order to improve in a structurally simple manner the variation width when the conveyor arrangement is in use, the separator should be provided with at least two retaining fingers, which, in a manner predetermined by a controller, can be moved into and successively out of the conveying path of the conveyors on the track in front of, and behind, the conveyors to be separated.

21 Claims, 2 Drawing Sheets

CONVEYOR ARRANGEMENT

FIELD OF THE INVENTION

The present invention refers to a conveyor arrangement including a plurality of conveyors on a track, and a separator including at least two retaining fingers for separating the conveyors.

BACKGROUND OF THE INVENTION

A conveyor arrangement is known from U.S. Pat. No. 3,055,311. The known conveyor arrangement includes a separator which is constructed like an arm, the front and rear ends of the arm defining retaining fingers. The arm is adapted to be pivoted about an axis in such a way that the retaining fingers successively enter the path of the conveyor means on the rail. For stopping and for releasing each conveyor means, the arm is pivoted about the axis. This pivotal movement about the axis has, however, the effect that the retaining fingers move along a semicircular path; in the known conveyor arrangement, this effect is utilized for giving the released conveyor means a push in the conveying direction. This, however, means that precisely predetermined distances between the conveyor means cannot be achieved.

A conveyor arrangement known from German Utility Model 94 02 990 serves to separate conveyor means, before they enter a switch, in such a way that a distance is established between the individual conveyor means, which corresponds to the change-over time of the switches at a predetermined speed of the conveyor means. The aim to be achieved by this measure is that, even at very high conveying speeds, only the conveyor means to be rerouted in the respective switch is located in the switch and that the switch has enough time to change over before the next conveyor means moves into the switch. The separator used for the purpose of separating includes a deflection wheel provided with seat recesses on the circumference thereof, each of the seat recesses being adapted to receive therein one conveyor means. It follows that the distances between the seat recesses are predetermined from the very beginning and cannot be varied. Furthermore, due to the fact that the separator is implemented as a deflection wheel, the use of the separator is limited to deflection points in the conveying path.

In comparison with this prior art, it is the object of the present invention to provide a conveyor arrangement which, when in operation, permits a higher degree of variability in a structurally simple manner.

SUMMARY OF THE INVENTION

By means of the structural design of the separator according to the present invention, the movement of the retaining fingers can be adapted with the aid of the control means to the preselected conveying speed and the desired distance in a structurally simple manner. The first retaining finger serves to hold the conveyor means to be separated and the second retaining finger retains the subsequent conveyor means so that this last-mentioned conveyor means is prevented from following the separated conveyor means immediately as soon as the first retaining finger is drawn back. The separator according to the present invention can be provided at any point of the track, i.e. also at straight paths.

The speed of movement of the retaining fingers can be varied so that the effect produced by the separator can be adapted to the predetermined mode of operation.

A particularly preferred, structurally simple and functionally reliable structural design can be used as the crank driving mechanism for the retaining fingers.

The forced coupling of the movement of the two retaining fingers can be realized in a structurally simple manner.

In accordance with an expedient embodiment, more than two retaining fingers are provided, a number of six retaining fingers being preferred.

The dimension of the crank driving mechanism should be adapted to the dimension of the conveyor means in the conveying direction in such a way that the distance between two neighbouring retaining fingers corresponds to the dimension of the conveyor means in the conveying direction at the point of engagement.

The separator according to the present invention is particularly suitable for use with a drive means that permits the conveyor means to accumulate, but the separator can also be used for other drive means, provided that it is guaranteed that the conveyor means can be separated from the drive means.

BRIEF DESCRIPTION OF THE DRAWINGS

In the following, one embodiment of the present invention will be explained in more detail on the basis of the drawings, in which.

DETAILED DESCRIPTION OF THE INVENTION

Figure 1:
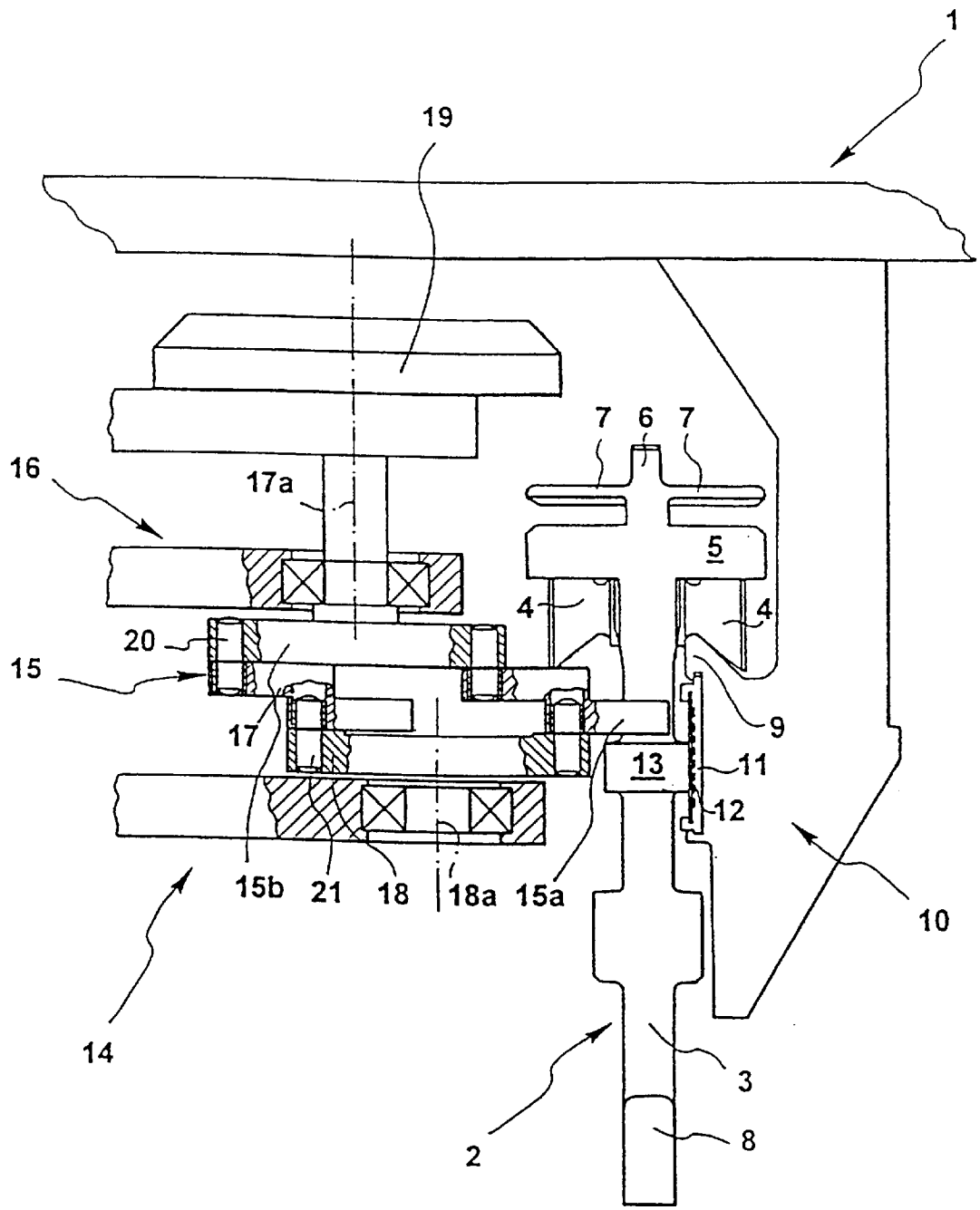
FIG. 1 shows a schematic representation of the most important parts of a conveyor arrangement according to the present invention including a separator.

FIG. 1 discloses a conveyor arrangement 1 for conveying suspended items inside a plant. The conveyor arrangement 1 is provided with a plurality of conveyor means 2, only one of said conveyor means 2 being shown. Each of the conveyor means 2 comprises a vertical, elongate, rod-shaped carrier 3, a runner 4 projecting beyond said carrier 3 on each side thereof. The runners 4 are arranged below a cover 5. On the upper side of each carrier 3 there are provided guide pins 6, which are arranged in the vertical centre line of the carrier 3, and guide pieces 7 projecting at both sides and guiding the conveyor means 2 e.g. over switches and junctions. On the lower end of the carrier 3, which faces away from the runners 4, a hook 8 is provided for attaching the items to be conveyed.

The runners 4 are adapted to be rotated about a horizontal axis and they have grooved circumferential surfaces so that they are adapted to roll along an upwardly curved rail 9 of a track 10. Along the track 10, a friction belt 12, which is accommodated in a guide means 11, extends below the rail 9 and in parallel therewith; when the conveyor means 2 rolls along the rail 9 in a condition in which it is suspended from the rail 9 by means of at least one of its runners 4, a driving projection 13 of the conveyor means 2 comes into engagement with the friction belt 12 under the influence of gravity. The friction belt 12 moves in the desired conveying direction, which extends at right angles to the plane of the drawing in the case of the embodiment shown, and entrains the conveyor means 2 through frictional engagement with the projection 13.

The structural design and the mode of operation of the conveyor means 2, of the track 10 and of the drive means 12 are desribed in more detail in German Utility Model 92 10 549, which is herewith referred to.

A separator 14 is arranged at a predetermined point along the track 10, the separator being provided with a plurality of retaining fingers 15. With the aid of a control means 16, the retaining fingers 15 are adapted to be moved into the conveying path of the conveyor means 2 on the track 10 in a predetermined manner so that they define a stop for oncoming conveyor means 2, this being shown on the basis of the retaining finger 15a. Subsequently, the retaining fingers 15 can be moved out of the conveying path so that the conveyor means 2 will be released and able to continue its movement along the track 10.

The retaining fingers 15 are implemented as a coupling means between a first circular crank disk 17 and a second circular crank disk 18 of a crank driving mechanism. The first, upper crank disk 17 is rotatably supported by means of a vertical axis of rotation 17a, said first crank disk 17 being driven by a motor 19 at a predetermined, controllable speed. The second, lower crank disk 18 extends parallel to the upper crank disk 17 and is supported such that it is freely rotatable about an axis of rotation 18a. The axis of rotation 18a is displaced relative to the axis of rotation 17a in the direction of the track 10 and parallel to said axis of rotation 17a, but it is positioned in the same vertical plane as said axis of rotation 17a, the vertical plane extending at right angles to the track 10 (cf. also FIG. 2).

In the embodiment shown, the retaining fingers 15 are off-set, but they can also be implemented as a straight bar. Each retaining finger 15 has one of its free ends rotatably supported in the vicinity of the circumference of the upper, driven crank disk 17 via a pivot joint 20 implemented as a pin. At a point close to its offset, i.e. in the middle between its free ends, each retaining finger 15 is additionally connected to the lower, freely rotatable crank disk 18 in the vicinity of the circumference thereof, said connection being established via a further pivot joint 21 including a pivot pin. The two crank disks 17, 18 have the same diameter. The distance between the two pivot joints 20 and 21, when they extend in the plane defined by the axes of rotation 17a and 18a, corresponds to the distance between the axes of rotation 17a and 18a. The diameter of the crank disks 17 and 18 as well as the distance between the pivot joints of the retaining fingers on each of the crank disks is adapted to the dimension of the conveyor means 2 in the conveying direction A at the point of contact with the retaining fingers in such a way that only a single conveyor means 2 fits in between two respective successive retaining fingers 15.

Figure 2:
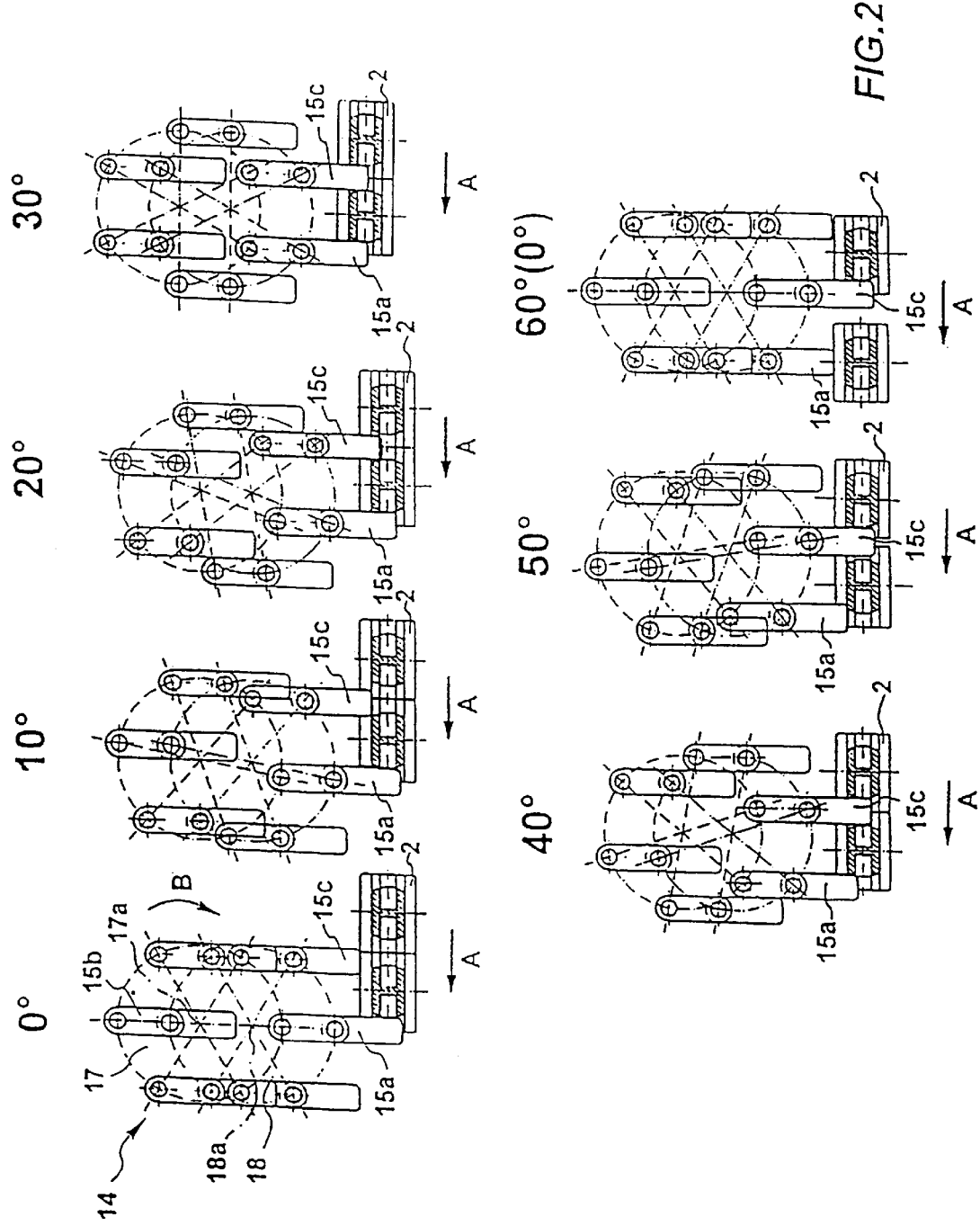
FIG. 2 shows a top view of the separator of FIG. 1, the separator being shown in different operating phases.

In the following, the mode of operation of the separator 14 will be explained on the basis of the phase images in FIG. 2. When the conveyor arrangement is in operation, the upper crank disk 17 is driven by the motor 19 in the direction of arrow B. The retaining fingers 15 act as a coupling means and, when the upper crank disk 17 rotates, they rotationally entrain the lower, freely rotatable crank disk 18. In the course of this process, the longitudinal axis of the retaining fingers 15 remains always oriented at right angles to the track 10, as can also be seen in FIG. 2.

What is claimed is:

1. A conveyor arrangement comprising a plurality of conveyor means adapted to be conveyed on a track, and a separator for separating said conveyor means, said separator including at least two retaining fingers, which, in a manner predetermined by a control means, are capable of movement into and successively out of a conveying path of the conveyor means on the track in front of and behind the conveyor means to be separated, wherein the control means includes a crank driving mechanism for the retaining fingers, and the crank driving mechanism comprises a first crank, which is capable of rotation about a first axis of rotation, and a second crank, which is freely rotatable about a second axis of rotation, the second axis of rotation being arranged parallel to and in spaced relationship with the first axis of rotation, and the retaining finger, which acts as respective coupling means between the cranks, is connected to one crank via a first pivot joint at the first end thereof and to the other crank via a second pivot joint at a point between the ends thereof such that a second free end of the retaining finger is capable of movement into and out of the conveying path of the conveyor means.

2. A conveyor arrangement according to claim 1, wherein the control means includes a motion drive for moving the retaining fingers at a predeterminable and variable speed.

3. A conveyor arrangement according to claim 1, wherein the first pivot joint of the retaining finger is articulated on the first, driven crank and the second pivot joint is articulated on the second, freely rotatable crank.

4. A conveyor arrangement according to claim 1, wherein the first driven cranks of the retaining fingers are interconnected such that the first driven cranks are secured against rotation relative to one another.

5. A conveyor arrangement according to claim 1, wherein the crank driving mechanism includes a first crank disk, the first pivot joints of the retaining fingers being distributed over the circumference of said crank disk.

6. A conveyor arrangement according to claim 5, wherein the crank driving mechanism includes a second, freely rotatable crank disk, the second pivot joints of the retaining fingers being distributed over the circumference of said second crank disk.

7. A conveyor arrangement according to claim 1, wherein the at least two retaining fingers comprises six retaining fingers.

8. A conveyor arrangement according to claim 5, wherein the pivot joints of the retaining fingers are arranged on the crank disk at regular circumferential intervals corresponding to the dimension of the conveyor means in the direction of the conveying path.

9. A conveyor arrangement according to claim 1, wherein the conveyor means are adapted to be transported along the track with the aid of a drive means permitting the conveyor means to accumulate.

10. A conveyor arrangement according to claim 2, the first pivot joint of the retaining finger being articulated on the first, driven crank and the second pivot joint being articulated on the second, freely rotatable crank.

11. A conveyor arrangement according to claim 2, wherein the first driven cranks of the retaining fingers are interconnected such that the cranks are secured against rotation relative to one another.

12. A conveyor arrangement according to claim 3, wherein the first driven cranks of the retaining fingers are interconnected such that the cranks are secured against rotation relative to one another.

13. A conveyor arrangement according to claim 2, wherein the crank driving mechanism includes a first crank disk, the first pivot joints of the retaining fingers being distributed over the circumference of said crank disk.

14. A conveyor arrangement according to claim 3, wherein the crank driving mechanism includes a first crank disk, the first pivot joints of the retaining fingers being distributed over the circumference of said crank disk.

15. A conveyor arrangement according to claim 5, wherein the crank driving mechanism includes a second, freely rotatable crank disk, the second pivot joints of the retaining fingers being distributed over the circumference of said second crank disk.

16. A conveyor arrangement according to claim 13, wherein the crank driving mechanism includes a second, freely rotatable crank disk, the second pivot joints of the retaining fingers being distributed over the circumference of said crank disk.

17. A conveyor arrangement according to claim 5, wherein the first pivot joints of the retaining fingers are arranged on the first crank disk at regular circumferential intervals corresponding to the dimension of the conveyor means in the direction of the conveying path.

18. A conveyor arrangement according to claim 6, wherein the first pivot joints of the retaining fingers are arranged on the first crank disk at regular circumferential intervals corresponding to the dimension of the conveyor means in the direction of the conveying path.

19. A conveyor arrangement according to claim 13, wherein the pivot joints of the retaining fingers are arranged on the crank disk at regular circumferential intervals corresponding to the dimension of the conveyor means in the direction of the conveying path.

20. A conveyor arrangement according to claim 2, wherein the conveyor means are adapted to be transported along the track by a friction drive.

21. A conveyor arrangement according to claim 3, wherein the conveyor means are adapted to be transported along the track by a friction drive.

* * * * *